Oct. 2, 1951     M. F. JOHNSON     2,570,060
DOUBLE PIE PAN
Filed June 21, 1949

*INVENTOR.*
Maude Fulton Johnson
BY
Mawhinney & Mawhinney
ATTORNEYS

Patented Oct. 2, 1951

2,570,060

UNITED STATES PATENT OFFICE 2,570,060

DOUBLE PIEPAN

Maude Fulton Johnson, New York, N. Y.

Application June 21, 1949, Serial No. 100,495

2 Claims. (Cl. 99—428)

The present invention relates to improvements in double pie pans, and has for an object to provide an improvement pan for the baking of pies in which provision is made for the salvage of the juices ordinarily lost in the baking operation.

Heretofore with the conventional pie pan the juices generated incident to heating and baking and the expansion of the pie filling spill over and are lost to the detriment of the pie. The loss of these juices is also undesirable for the reason that the same drip down into the bottom of the oven where they are burned causing undesirable smoking of the oven and of the room in which the stove is located and also fouling the bottom and any other parts of the oven into which these juices come in contact; entailing a cleaning of the oven and as housekeepers are well aware this cleaning is attended with great difficulty.

It has been proposed to provide wells at the sides of the pan to catch the juices generated in the baking. While this arrangement has some efficacy to prevent spilling of the juices into the oven, such juices are apparently retained in the wells and are lost to the pie. Moreover in removing the pie from the oven such juices are often spilled from the wells onto the oven bottom and onto the floor.

It is an object of the invention to correct the above disadvantages in pie baking and to provide a novel construction of pie pan which will conserve the juices for the pie and effectively prevent them from being spilled over either during the baking or at the time of removal of the pie pan from the oven.

Another object of the invention is to accomplish these results in a pie pan of simple form conforming substantially to conventional pie pans with only slight constructional modification and to so arrange such construction that it does not interfere with the inner perforated pie pan which I prefer to use in connection with the invention.

With the foregoing and other objects in view, the invention will be more fully described hereinafter, and will be more particularly pointed out in the claims appended hereto.

Figure 1:
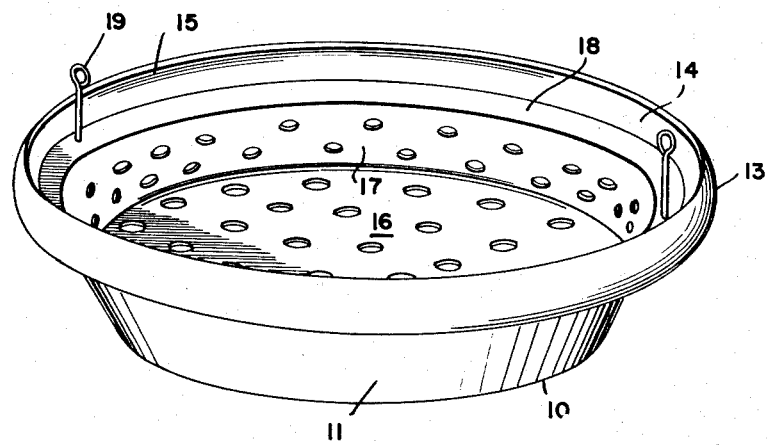

In the drawings, wherein the symbols refer to like or corresponding parts throughout the several views, Figure 1 is a perspective view of a form of double pie pan constructed in accordance with the present invention.

Figure 2:
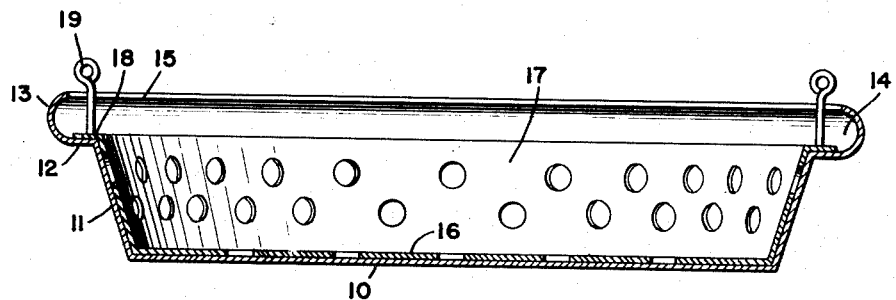
Figure 3:
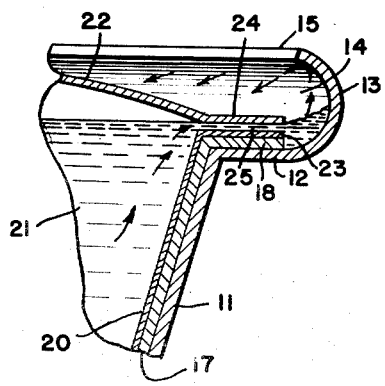

Figure 2 is a vertical section taken substantially centrally through the same, and Figure 3 is a fragmentary vertical section taken on an enlarged scale and illustrating the method of use.

Referring more particularly to the drawings 10 designates the bottom of the outer pie pan and 11 the side wall thereof which is illustrated as flaring in accordance with the conventional practice. The pan has a horizontal outstanding flange 12 at the upper edge of the side wall 11 which is also a customary construction.

The invention consists in providing the outwardly curved upstanding flange 13 rising in a generally vertical direction from the outer edge of the flange 12. Due to the curvature of this upstanding flange 13 a trap or pocket 14 is housed there within which communicates directly with the space above the flange 12 and generally with the upper portion of the pie pan. The upstanding flange 13 terminates in a free edge 15 the diameter of which is slightly greater than the diameter of the flange 18 of the inner perforated pie pan which comprises the perforated bottom 16 and the perforated side wall 17. The flange 18 is outturned from the upper free edge of the flaring side wall 17 and is constructed and adapted to rest upon the flange 12 of the main or outer pan.

Supporting eyes 19 may be affixed to the flange 18 at diametric opposite or other points for receiving a hook or other instrument or for grasping in the hands to raise the inner pan and lift the same out from the outer pan.

Referring more particularly to Figure 3 the bottom pie crust is represented at 20, the filling at 21 and the top crust at 22. The crust edges are indicated at 23 and 24 respectively and at 25 is represented a bulge between the edges.

In the use of the device the inner pan may be assembled into the outer pan or if desired the pie may be initially placed in the inner pan and the inner pan later lowered into the outer pan.

In any event the outer crust 20 is first placed in the inner pan and the crust edge 23 pressed down over the flange 18. Thereupon the filling is loaded into the pan on the bottom crust 20 and the top crust 22 subsequently placed thereover with the edge 24 of the top crust overlying the edge 23 of the bottom crust upon the flange 18.

In accordance with good practice the two edges 24 and 23 are then pressed together downwardly upon the flange 18 by the fingers or some other implement in order to form as tight a seal between the edges as practicable.

The assembled pie and pie pans are thereupon placed in the oven. As the filling becomes heated it and its juices will expand upwardly and raise the upper crust 22. The generation and expansion of the hot juices will at certain portions of the pie reach such volume and proportions that escape is necessary and in such cases the juices will force a way 25 through the dough or between the edges 23, 24 and will ordinarily overflow the flanges of the pie pan and drip onto the bottom of the oven. In the present case this hot liquid is received in the pocket or trap 14 and due to the upstanding vertical flange it will be prevented from overflowing or later spilling during any tilting movement of the pie pan. Moreover the incurved inner wall of the vertical upstanding flange 13 will induce a movement in the hot liquid juices generally in the path of the arrows indicated in Figure 3. In other words induced by the heat the juices will tend to expand and rise and will ride along the curved wall of the flange 13 being deflected by the inwardly curved upper portion adjacent the edge 15 so that a closed circuit or cycle of the juices is formed acting to return these juices to the pie. As fast as the juices escape from the filling they are therefore automatically returned by the co-action of the expansion incident to the heat and temperature and the character of the upstanding flange 13 and its incurved internal wall. When the baking is completed the pan is removed from the oven and no undue care need be exerted in holding the pan upright as tilting movements within quite a wide angle will still not operate to spill any of the juices from the pie pan due to the character of the upstanding ange 33 and its pocketed formations.

Later the inner perforated pan may be lifted out of the main pan, the flanges 18 clearing the edge 15 of the upstanding flange 13.

The inner perforated pan permits air to circulate to the pie when removed from the outer pan. The pie is thus kept from becoming soggy and this tends to preserve the pie intact. With the perforated pan the pie may be maintained in the pan and slices cut from the pie without removing the pie from the perforated pan. This practice could not be carried out with the conventional solid bottom pie pan as the pie would sweat in such a pan.

As illustrated in Figure 3 the flange 18 of the inner pan is of less radical width than the flange 12 on which it rests which produces with the concave inner wall of the upstanding flange 13 a well at the bottom of the pocket 14, into which well the juices from the filling 21 overflow and drop by gravity as such juices emerge from between the edges 23 and 24 of the pie crusts. From this well the juices are driven up the concave inner wall and recycled back onto the top crust 22 as shown by the arrows.

It is obvious that various changes and modifications may be made in the details of construction and design of the above specifically described embodiment of this invention without departing from the spirit thereof, such changes and modifications being restricted only by the scope of the following claims:

What is claimed is:

1. A double pie pan construction comprising an outer pan having imperforate bottom and side walls, a horizontal flange outstanding from the upper edge of the side wall, an upstanding flange rising from the outer edge of the horizontal flange, said upstanding flange curved vertically into a convex outer wall and a concave inner wall forming a combined internal pocket and recycling inner curved wall, said upstanding curved flange having an inwardly-directed upper free edge lying radially outwards of the vertical projection of said horizontal flange, and an inner pan having perforated bottom and said walls removably fitted in said outer pan, a horizontal flange outstanding from the upper edge of the side wall of the inner pan adapted to rest on the horizontal flange of the outer pan and being throughout all parts of less radius than that of the upper free edge of said upstanding flange to permit the horizontal flange of the inner pan to clear said upper free edge in inserting and removing the inner pan, said horizontal flange of the inner pan being of less radial width than the horizontal flange of the outer pan to provide a well at the bottom of the inner concave wall of the pocket, said inner pan adapted to receive the bottom crust and filling of a pie with the edges of the bottom crust and top crust supported on the horizontal flange of the inner pan whereby juices from the filling driven by the expanding action of the heat through the crust edges will drop by gravity over the outer edge of the horizontal flange of the inner pan into said well and against said concave wall of the pocket up which concave wall and through said pocket the juices will be moved incident to convection action of the heat with the juices being deflected inwardly of the upstanding flange and back onto the top crust by the upwardly and inwardly curved contour of the inner pocket wall adjacent to and including its upper inwardly over-hanging free edge.

2. A double pie pan construction comprising an outer pan having bottom and side walls, a horizontal flange outstanding from the upper edge of the side wall, an upstanding flange rising from the outer edge of the horizontal flange, said upstanding flange curved vertically into a convex outer wall and a concave inner wall forming a combined internal pocket and recycling inner curved wall, said upstanding curved flange having an inwardly-directed upper free edge lying radially outwards of the vertical projection of said horizontal flange, and an inner pan having bottom and side walls removably fitted in said outer pan, a horizontal flange outstanding from the upper edge of the side wall of the inner pan adapted to rest on the horizontal flange of the outer pan and being throughout all parts of less radius than that of the upper free edge of said upstanding flange to permit the horizontal flange of the inner pan to clear said upper free edge in inserting and removing the inner pan, said inner pan adapted to receive the bottom crust and filling of a pie with the edges of the bottom crust and top crust supported on the horizontal flange of the inner pan whereby juices from the filling driven by the expanding action of the heat through the crust edges and into said pocket will move up the concave wall in a recycling action being ultimately deflected onto the top crust by the upwardly and inwardly curved contour of the inner pocket wall adjacent to and including its upper inwardly overhanging free edge.

MAUDE FULTON JOHNSON.

REFERENCES CITED

The following references are of record in the file of this patent:

UNITED STATES PATENTS

| Number | Name | Date |
| --- | --- | --- |
| Re. 17,066 | Smythe | Aug. 14, 1928 |
| 868,312 | Wilcox | Oct. 15, 1907 |
| 987,525 | Wing | Mar. 21, 1911 |
| 1,371,718 | Zimmermann | Mar. 15, 1921 |
| 1,411,128 | Strobhart | Mar. 28, 1922 |
| 1,970,454 | Hellmann | Aug. 14, 1934 |
| 2,026,829 | Ellinger | Jan. 7, 1936 |
| 2,074,448 | Young | Mar. 23, 1937 |
| 2,237,697 | Brown | Apr. 8, 1941 |
| 2,297,914 | Pino | Oct. 6, 1942 |
| 2,282,444 | Winters | May 12, 1942 |
| 2,303,841 | Kircher | Dec. 1, 1942 |

FOREIGN PATENTS

| Number | Country | Date |
| --- | --- | --- |
| 367,681 | Great Britain | Feb. 25, 1932 |